(12) United States Patent
Yu et al.

(10) Patent No.: US 11,150,914 B1
(45) Date of Patent: Oct. 19, 2021

(54) SHARING CACHED CLASS DATA IN A CONTAINERIZED ENVIRONMENT

(71) Applicant: International Business Machines Corporation, Armonk, NY (US)

(72) Inventors: Anyang Yu, Markham (CA); Dhruv Chopra, Milton (CA); Alen Badel, Oakville (CA); Vijay Sundaresan, North York (CA); Marius Pirvu, Toronto (CA); Michael Dawson, Ottawa (CA); Daniel Heidinga, Ottawa (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/029,483

(22) Filed: Sep. 23, 2020

(51) Int. Cl.
  *G06F 9/44* (2018.01)
  *G06F 9/445* (2018.01)
  *G06F 8/65* (2018.01)
(52) U.S. Cl.
  CPC ............ *G06F 9/44563* (2013.01); *G06F 8/65* (2013.01); *G06F 9/44521* (2013.01)
(58) Field of Classification Search
  CPC ....................................................... G06F 9/44
  See application file for complete search history.

(56) References Cited

U.S. PATENT DOCUMENTS

| 9,336,018 | B2 | 5/2016 | Zhou et al. | |
| 10,338,899 | B2 | 7/2019 | Dawson et al. | |
| 10,606,629 | B2 | 3/2020 | Heidinga et al. | |
| 2011/0035735 | A1 | 2/2011 | Kramp et al. | |
| 2014/0331017 | A1* | 11/2014 | Dawson | G06F 12/10 711/162 |
| 2020/0387361 | A1* | 12/2020 | Modeel | G06F 8/63 |

OTHER PUBLICATIONS

MCS ("Multi-layer Class data Sharing Inside Docker for JVMs") (Year: 2019).*

(Continued)

*Primary Examiner* — Jae U Jeon
(74) *Attorney, Agent, or Firm* — Edward J. Wixted, III

(57) ABSTRACT

Embodiments of the present invention comprise a class sharing orchestrator (CSO) operating as a subsystem of a container orchestrator. The CSO manages sharing of class data among containerized applications to improve startup performance, CPU consumption and memory footprint. The CSO stores application class data in a shared class cache (SCC). The CSO provides a compatible SCC to every deployed application running within the CSO's purview. The CSO collects SCC data from running applications, and processes the data offline to continuously improve the quality of SCCs provided to each deployment, while causing minimum impact to running applications. The CSO combines updates from running applications of a given type to generate an improved quality SCC for use by newly launched applications of the same type. The CSO comprises an SCC update mechanism that optimizes the size, and network traffic, associated with SCC data exchange, and guarantees SCC quality improves over time.

20 Claims, 7 Drawing Sheets

(56) References Cited

OTHER PUBLICATIONS

"Multi-layer Class Data Sharing Inside Docker for Java Virtual Machines (JVMs)", Disclosed Anonymously, an IP.com Prior Art Database Technical Disclosure, IP.com Number: IPCOM000260600D, IP.com Electronic Publication Date: Dec. 10, 2019, 4 pages, <https://priorart.ip.com/IPCOM/000260600>.

Bhattacharya et al., "Improving the performance of JVM startup using the shared class cache", : Proceedings of the 2017 IEEE Pacific Rim Conference on Communications, Computers and Signal Processing (PACRIM), Aug. 21-23, 2017, Victoria, BC, Canada, 6 pages, <https://ieeexplore.ieee.org/document/8121911>.

Dudits, Patrik, "Warming Up Payara Micro Container Images in 5.201", Warming Up Payara Micro Container Images in 5.201, Published on Mar. 5, 2020, Printed Jun. 12, 2020, 8 pages, <https://blog.payara.fish/warming-up-payara-micro-container-images-in-5.201>.

Li, Yi, "Java's Transformation in the Cloud-Native Era", Java's Transformation in the Cloud-Native Era—Alibaba Cloud community, Printed Jun. 12, 2020, 13 pages, <https://www.alibabacloud.com/blog/javas-transformation-in-the-cloud-native-era_596174>.

Vianton, Younes, "The Multi-Layer Shared Class Cache for Docker", The Multi-Layer Shared Class Cache for Docker—Eclipse OpenJ9 Blog, Posted on Nov. 5, 2019, Printed on Jun. 12, 2020, 11 pages, (https://blog.openj9.org/2019/11/05/the-multi-layer-shared-class-cache-for-docker/>.

Mell et al., "The NIST Definition of Cloud Computing", Recommendations of the National Institute of Standards and Technology, Special Publication 800-145, Sep. 2011, 7 pages.

\* cited by examiner

SHARING CACHED CLASS DATA IN A CONTAINERIZED ENVIRONMENT

BACKGROUND

The present invention relates generally to the field of large scale computing, and more particularly to "platform as a service" computing environments having multiple, isolated, user spaces sometimes referred to as "containers".

In a "platform as a service" computing environment, user spaces are isolated from one another using virtualization implemented at the operating system level.

In some dynamic language computing environments, applications perform just-in-time (JIT) compilation at runtime, and class files containing read-only class data and ahead-of-time (AOT) compiled code to be run, are loaded on demand. Some systems use a caching mechanism wherein at application startup, the required classes are loaded quickly from the memory mapped file (the shared class cache, resident in RAM) while the JIT compilation quickly loads cached AOT compiled bodies.

SUMMARY

According to an aspect of the present invention, there is a method, computer program product and/or system for sharing cached class data, that performs the following operations (not necessarily in the following order): (i) initiating launch of a managed runtime application in a container of a containerized environment; (ii) receiving information with respect to the managed runtime application including an application image identifier, an argument associated with the managed runtime application, and a worker node identifier corresponding to a worker node associated with the managed runtime application; (iii) locating a first shared class cache (SCC), keyed by a combination of the application image identifier and the argument, in a central SCC repository managed by a server; and (iv) in response to locating the first SCC: (a) sending the first SCC to a client associated with the worker node, and (b) storing the first SCC in a local SCC repository; (v) receiving, from the client, a first update request associated with a type of the managed runtime application, including the application image identifier, the argument, information with respect to the worker node, additional class data, ahead-of-time compiled data, and execution data generated and accumulated over time with respect to the first SCC; (vi) determining to accept the first update request; and (vii) in response to accepting the first update request: (a) analyzing a plurality of update requests, including the first update request, to create analyzed update request data, (b) determining, based on the analyzed update request data, the analyzed update request data includes new data that is common to more than one update request of the plurality of update requests, and (c) modifying the first SCC, based on the new data, to generate a second SCC.

According to a further aspect of the present invention, there is a method, computer program product and/or system for sharing cached class data, that performs the following operations (not necessarily in the following order): (i) initiating launch of a managed runtime application in a container of a containerized environment; (ii) receiving information with respect to the managed runtime application including an application image identifier, an argument associated with the managed runtime application, and a worker node identifier corresponding to a worker node associated with the managed runtime application; (iii) locating a first shared class cache (SCC), keyed by a combination of the application image identifier and the argument, in a central SCC repository managed by a server; and (iv) in response to locating the first SCC: (a) sending the first SCC to a client associated with the worker node, and (b) storing the first SCC in a local SCC repository; (v) receiving, from the client, a first update request originated by the managed runtime application and associated with the first SCC, wherein the first update request is associated with a type of the managed runtime application, including the application image identifier, the argument, information with respect to the worker node, additional class data, ahead-of-time compiled data, and execution data generated and accumulated over time with respect to the first SCC; (vi) determining to reject the first update request; and (vii) in response to rejecting the first update request, sending, to the client, a second SCC.

DETAILED DESCRIPTION

Figure 1:
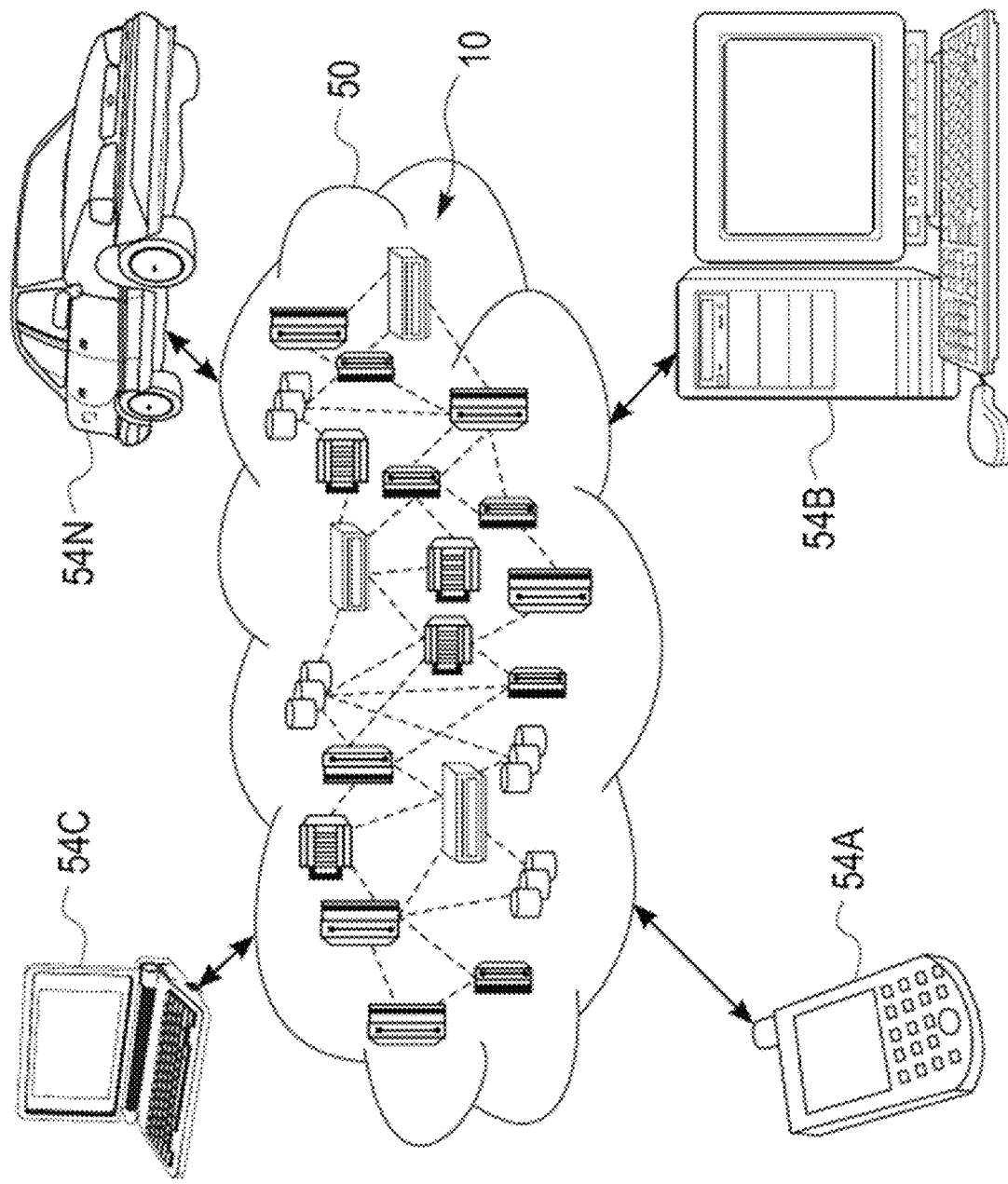
FIG. 1 depicts a cloud computing environment according to an embodiment of the present invention.

A container orchestrator, in accordance with some embodiments of the present invention, comprises a class sharing orchestrator (CSO) subsystem. The CSO manages sharing of class data among containerized applications in a cloud environment to improve application startup performance, CPU consumption and memory footprint. A shared class cache allows multiple virtual machines, that operate in isolation from one another, to share a single cache, herein referred to as a "shared class cache" (SCC) that holds application class data. A class cache configured as a memory mapped file stores three pieces of information: (1) the immutable part of the classes, (2) ahead-of-time (AOT) compiled code and (3) profiling data.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
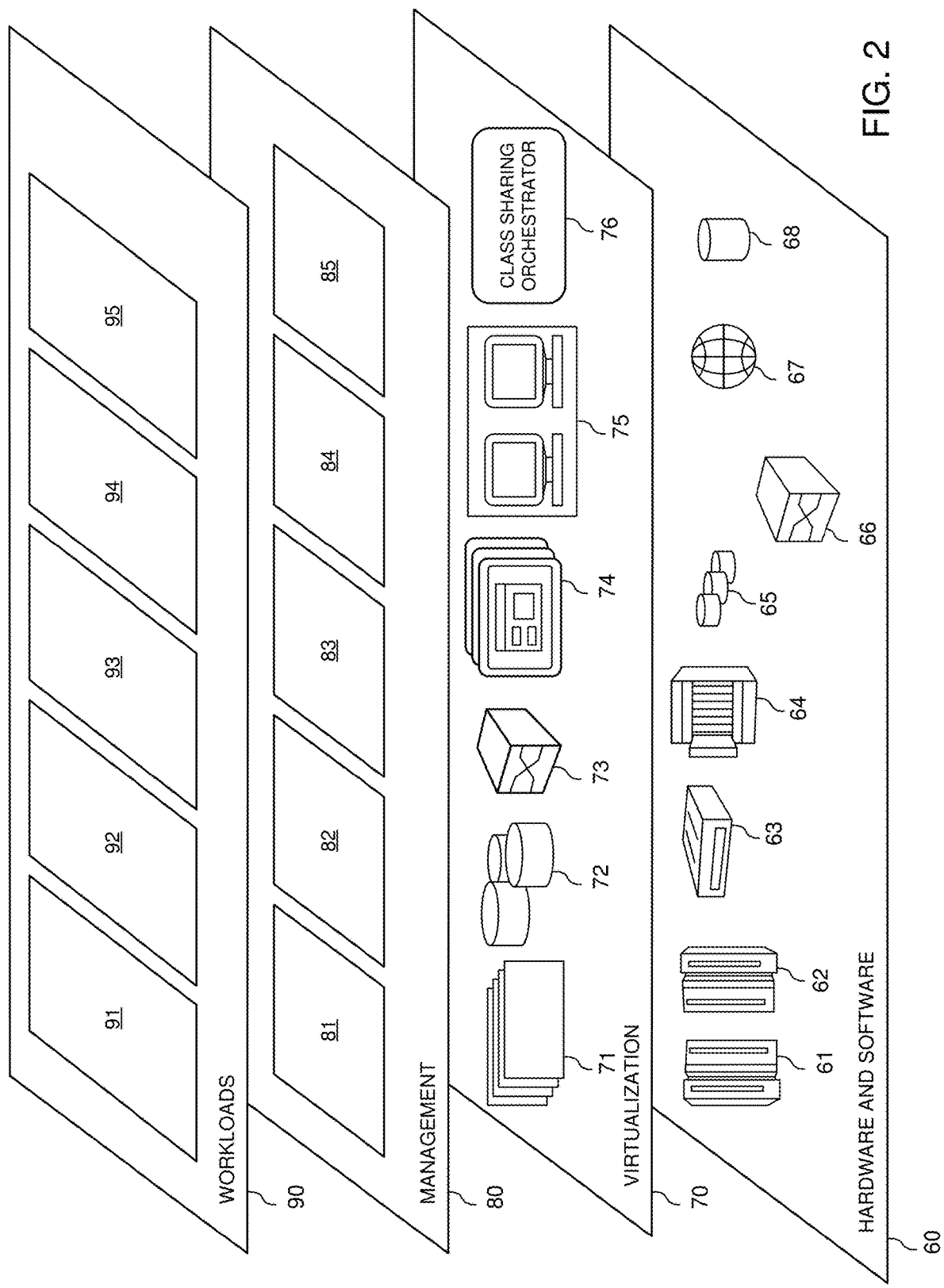
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; virtual clients 75; and class sharing orchestrator 76.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Figure 3:
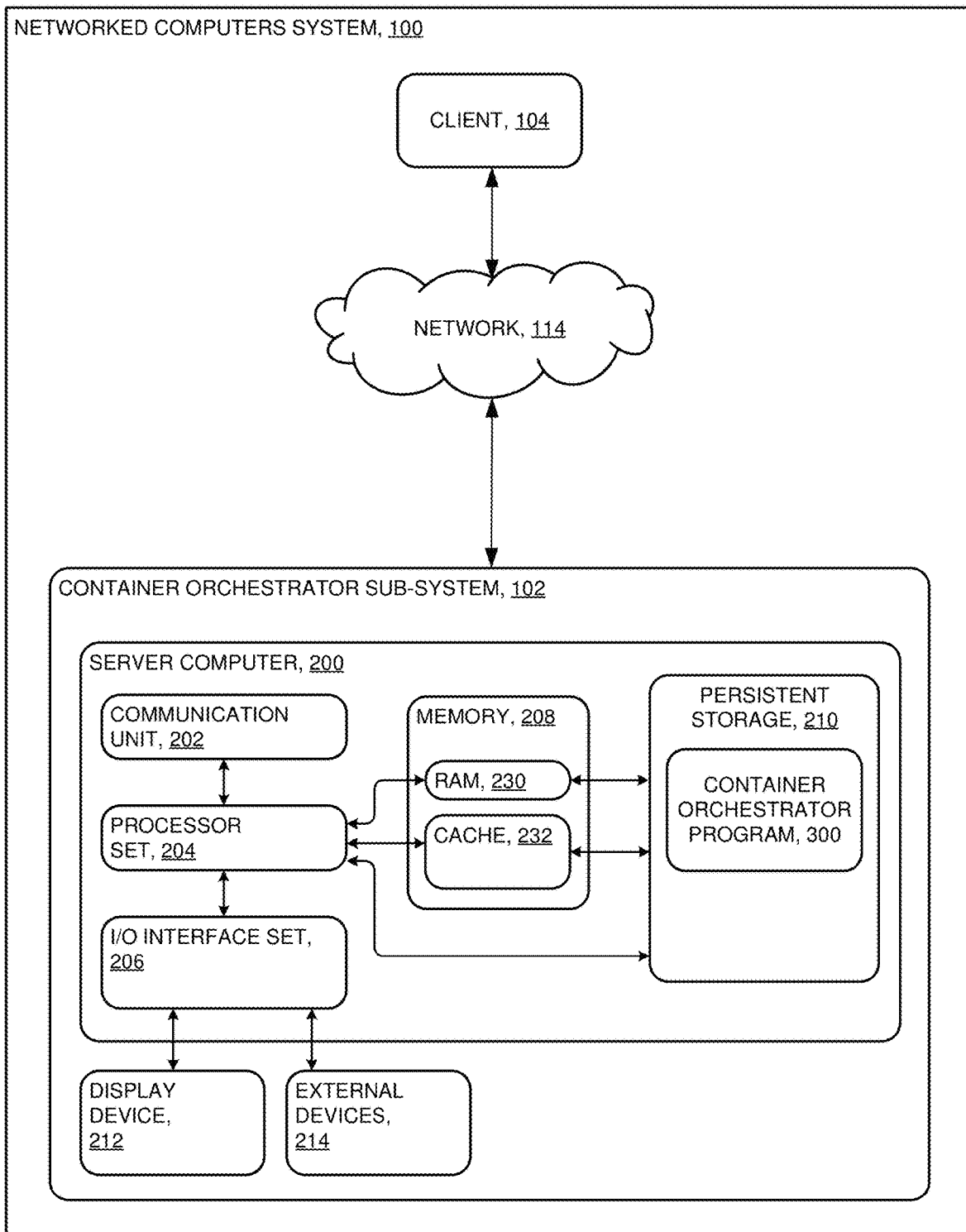
FIG. 3 is a block diagram of a system in accordance with at least one embodiment of the present invention.

An embodiment of a possible hardware and software environment for software and/or methods according to the present invention will now be described in detail with reference to the Figures. FIG. 3 is a functional block diagram illustrating various portions of networked computers system 100, including: container orchestrator sub-system 102; client computer sub-system 104; communication network 114; server computer 200; communication unit 202; processor set 204; input/output (I/O) interface set 206; memory 208; persistent storage 210; display device 212; external devices 214; random access memory (RAM 230); cache 232; and container orchestrator program 300.

Container orchestrator sub-system 102 is, in many respects, representative of the various computer sub-system(s) in the present invention. Accordingly, several portions of container orchestrator sub-system 102 will now be discussed in the following paragraphs.

Container orchestrator sub-system 102 may be a laptop computer, tablet computer, netbook computer, personal computer (PC), a desktop computer, a personal digital assistant (PDA), a smart phone, or any programmable electronic device capable of communicating with the client sub-systems via communication network 114. Container orchestrator program 300 is a collection of machine readable instructions and/or data that is used to create, manage, and control certain software functions that will be discussed in detail, below, in the Example Embodiment sub-section of this Detailed Description section.

Container orchestrator sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between server and client sub-systems.

Container orchestrator sub-system 102 is shown as a block diagram with many double arrows. These double arrows (no separate reference numerals) represent a communications fabric, which provides communications between various components of container orchestrator sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external devices 214 may be able to supply, some or all, memory for container orchestrator sub-system 102; and/or (ii) devices external to container orchestrator sub-system 102 may be able to provide memory for container orchestrator sub-system 102.

Container orchestrator program 300 is stored in persistent storage 210 for access and/or execution by one or more of the respective computer processor set 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Container orchestrator program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communication unit 202, in these examples, provides for communications with other data processing systems or devices external to container orchestrator sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage 210) through a communications unit (such as communication unit 202).

I/O interface set 206 allows for input and output of data with other devices that may be connected locally in data communication with server computer 200. For example, I/O interface set 206 provides a connection to external devices 214. External devices 214 will may include devices such as a keyboard, keypad, a touch screen, and/or some other suitable input device. External devices 214 can also include portable computer-readable storage media such as, for example, thumb drives, portable optical or magnetic disks, and memory cards. Software and data used to practice embodiments of the present invention, for example, container orchestrator program 300, can be stored on such portable computer-readable storage media. In these embodiments, the relevant software may (or may not) be loaded, in whole or in part, onto persistent storage 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature, herein, is used merely for convenience, and, thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 4:
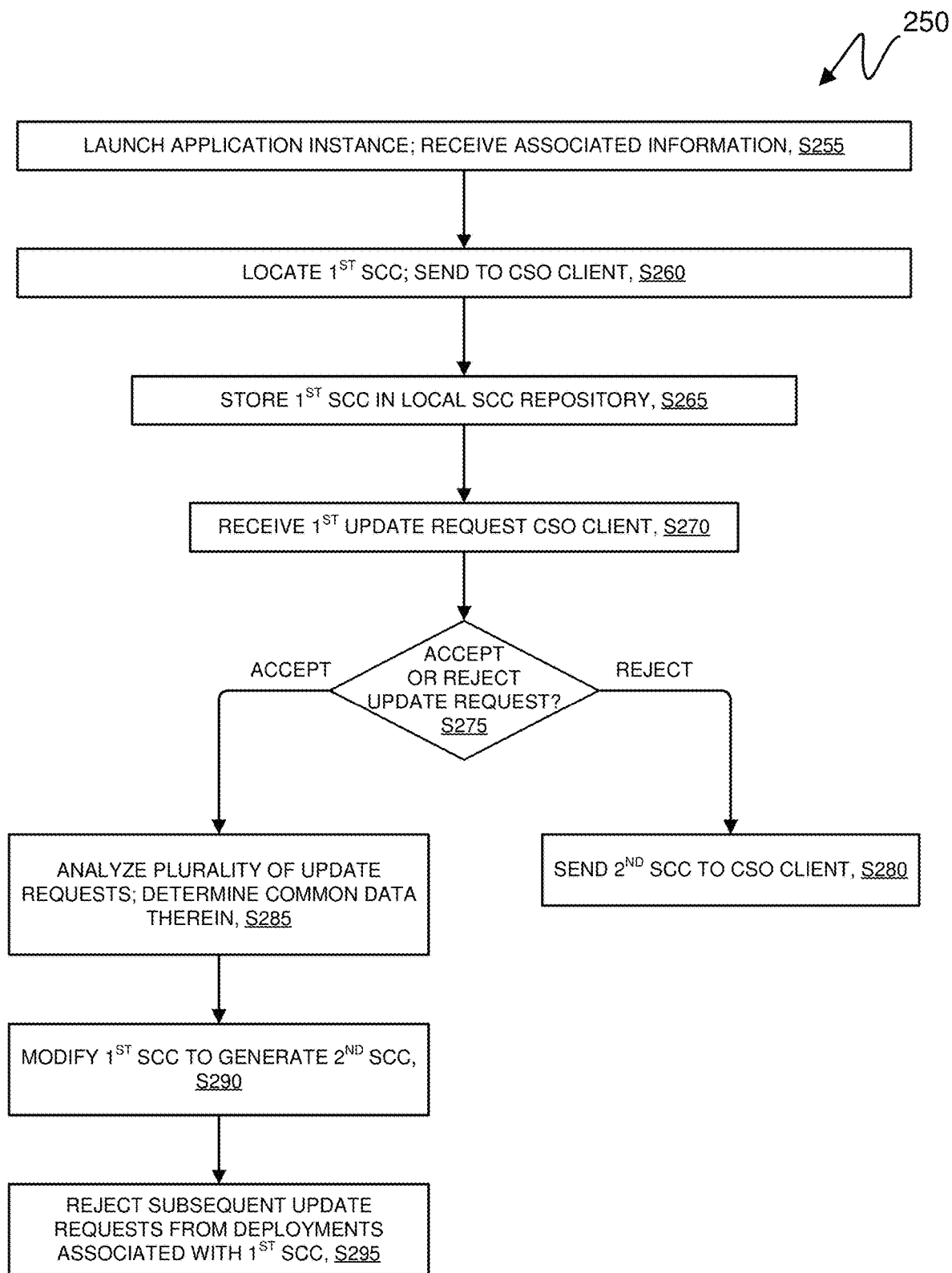
FIG. 4 is a flowchart showing a method performed, at least in part, in accordance with at least one embodiment of the present invention.
Figure 5:
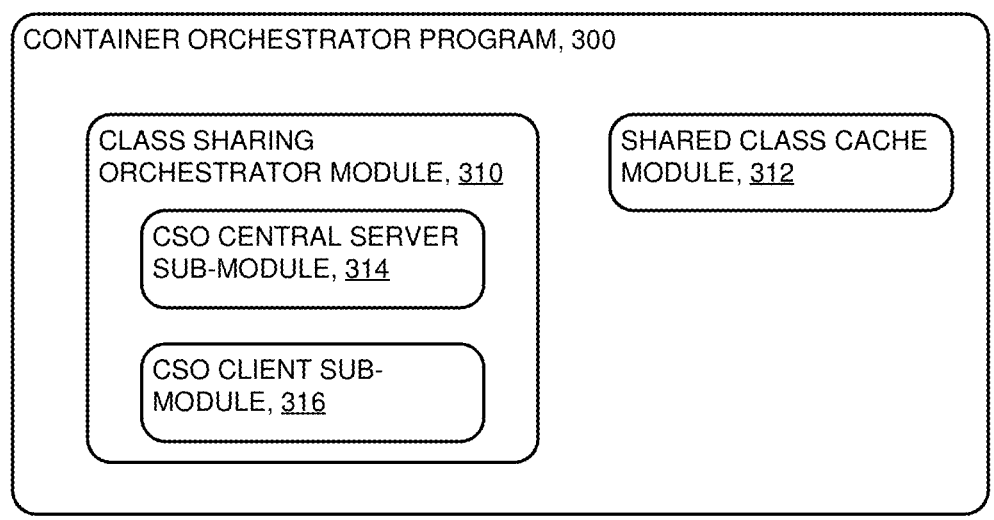
FIG. 5 is a block diagram showing a machine logic (for example, software) portion of a system in accordance with at least one embodiment of the present invention.

FIG. 4 shows flowchart 250 depicting a method in accordance with the present invention. FIG. 5 shows container orchestrator program 300 for performing at least some of the method operations of flowchart 250. This method and associated software will now be discussed, over the course of the following paragraphs, with extensive reference to FIG. 4 (for the method operation blocks) and FIG. 5 (for the software blocks). One physical location where container orchestrator program 300 of FIG. 5 may be stored is in persistent storage 210 (see FIG. 3).

Processing begins at operation S255, where container orchestrator program 300 initiates a launch of a managed runtime application in a first container of a containerized environment. Class sharing orchestrator module (CSO module 310), of container orchestrator program 300 receives information with respect to the managed runtime application including an application image identifier, a list of arguments passed to a first instance of the managed runtime application, and a worker node identifier corresponding to a worker node that hosts the first instance of the managed runtime application.

Processing proceeds at operation S260, where shared class cache module 312, of container orchestrator program 300, searches a central SCC repository for a shared class cache (SCC) that is suitable for use by the managed runtime application. Suitability is based on certain attributes associated with the managed runtime application. These attributes may include an identifier associated with the application image, one or more arguments associated with launch or operation of the application, and/or an identifier associated with the first container.

Processing proceeds at operation S265, where cache sharing orchestrator client sub-module (CSO client sub-module 316), of CSO module 310, of container orchestrator program 300, stores the shared class cache locally to the managed runtime application, that is, in the first container.

Processing proceeds at operation S270, where CSO central server sub-module 314 receives an update request from CSO client sub-module 316 (corresponding to the managed runtime application, or any other application running inside or outside the first container).

Processing proceeds at decision S275, where CSO central server sub-module 314 determines whether to accept or reject the update request received above with respect to operation S270. If CSO central server sub-module 314 determines to reject the update request, (decision S275, "Reject" branch), processing proceeds at operation S280, where CSO central server sub-module 314 sends to the requester (in this case, CSO client sub-module 316), a second shared class cache for use by the managed runtime application.

If CSO central server sub-module 314 determines to accept the update request, (decision S275, "Accept" branch), processing proceeds at operation S285, where CSO central server sub-module 314 stores the update request along with other requests (if any) having been previously received, and stored.

Once a threshold number of requests has been accumulated (or any other triggering event occurs), CSO central server sub-module 314 analyzes the plurality of accumulated update requests. In the embodiment of FIG. 4, CSO central server sub-module 314 determines that two or more update requests share at least some common data. Note: in some embodiments, multiple update requests associated with the same application type are analyzed together.

Processing proceeds at operation S290, where CSO central server sub-module 314, in response to determining that two or more update requests share common data, adds the common data to the first shared class cache, to generate a second shared class cache.

Processing proceeds at operation S295, where CSO central server sub-module 314 rejects subsequent update requests from deployments associated with the first shared class cache.

III. Further Comments and/or Embodiments

Some embodiments of the present invention may recognize one, or more, of the following facts, potential problems, and/or potential areas for improvement with respect to the current state of the art with respect to dynamic language environments (for example, Java): (i) just-in-time (JIT) compilation may add overhead which negatively impacts an application's performance, particularly at startup, when the vast majority of JIT compilation takes place; (ii) JIT compilation may impede fast application startup and ramp-up; and/or (iii) whereas class files are loaded on demand, for applications with a large number of classes to be loaded, class loading may contribute significantly to slow application startup.

In some embodiments, the term "application" refers to software programs that run on a virtual machine that can perform "just-in-time" compiling. Non-exhaustive examples of such applications include a stock exchange web application built from Spring Boot, and a hotel booking web application built from Open Liberty. Spring Boot and Open Liberty run on top of a Java Virtual Machine.

While references are herein made to certain products (for example, "Java", "OpenJ9", and "JVM"), embodiments of the present invention are not limited to such products. Some embodiments apply as well to other dynamic runtime environments that employ certain caching mechanisms, such as the shared class cache. (Note: the terms "Spring Boot", "Open Liberty", "Java", "Java Virtual Machine", "OpenJ9", and/or "JVM" may be subject to trademark rights in various jurisdictions throughout the world and are used here only in reference to the products or services properly denominated by the marks to the extent that such trademark rights may exist.)

Some embodiments of the present invention may include one, or more, of the following features, characteristics, and/or advantages: (i) continually improves the cache of compiled methods; (ii) adopts a continuously and incrementally improving approach, wherein the JIT compiles a faster version of a method which can be tracked and merged into the cache; (iii) optimizes around the use case of application runtimes on the cloud. (iv) a solution centers on an orchestration framework that automates container configuration; (v) statistics that may be used to improve performance are sent to a central location to be reused, to continuously improve the application compilation profiles; (vi) compilation profiles are dynamic, and able to communicate centrally, to obtain and improve the compilation profile associated with each respective workload on demand.

Some embodiments of the present invention are herein described in the context of OpenJ9, but are not limited in terms of applicability to OpenJ9. In OpenJ9, a Java application's class data is stored in a shared class cache (SCC). Shared class cache (SCC) is a memory mapped file that stores information including the following: (i) the immutable part of the classes, (ii) ahead-of-time (AOT) compiled code and (iii) profiling data. Application startup is accelerated because the required classes can be loaded quickly from the memory mapped file (the SCC, which is likely to be resident in RAM) while the JIT compilation is reduced to quickly loading cached AOT compiled bodies. The population of the SCC happens transparently at runtime, which ensures that only classes and methods needed by the application are cached, and AOT bodies are tailored, at least to some degree, to the running application. (Note: the terms "OpenJ9" and/or "Java" may be subject to trademark rights in various jurisdictions throughout the world and are used here only in reference to the products or services properly denominated by the marks to the extent that such trademark rights may exist.)

A class sharing orchestrator (CSO) in accordance with some embodiments of the present invention performs at least the following functions: (i) provides compatible, high quality SCCs to every deployment of a Java application on the cloud; (ii) continuously improves the quality of SCCs provided to each deployment by collecting SCC data from running applications and performing offline processing based on the collected SCC data, while causing minimum impact to the running applications.

The class sharing orchestrator (CSO) improves upon conventional solutions by: (i) enhancing the quality of the shared class cache (SCC); and/or (ii) improving usability of the SCC sharing feature of Java applications in a container environment. These improvements are described below in the following enumerated paragraphs.

Enhancing the quality of the SCC: In some embodiments, running containerized Java applications contribute their own run-time class data to a corresponding (original) SCC, via an SCC consolidation mechanism. The consolidation mechanism combines updates from running applications of the same type to generate a higher quality newly-formed SCC for future applications to use. The mechanism guarantees that the newly-formed SCC performs at least as well as, or better than, the original SCC.

Improving usability of the SCC sharing feature of Java applications in a container environment: In some embodiments, an SCC update mechanism optimizes the size of SCC data exchange, and the time of SCC data exchange among running applications on the cloud, to minimize impact of the CSO to running applications and network bandwidth.

Figure 6:
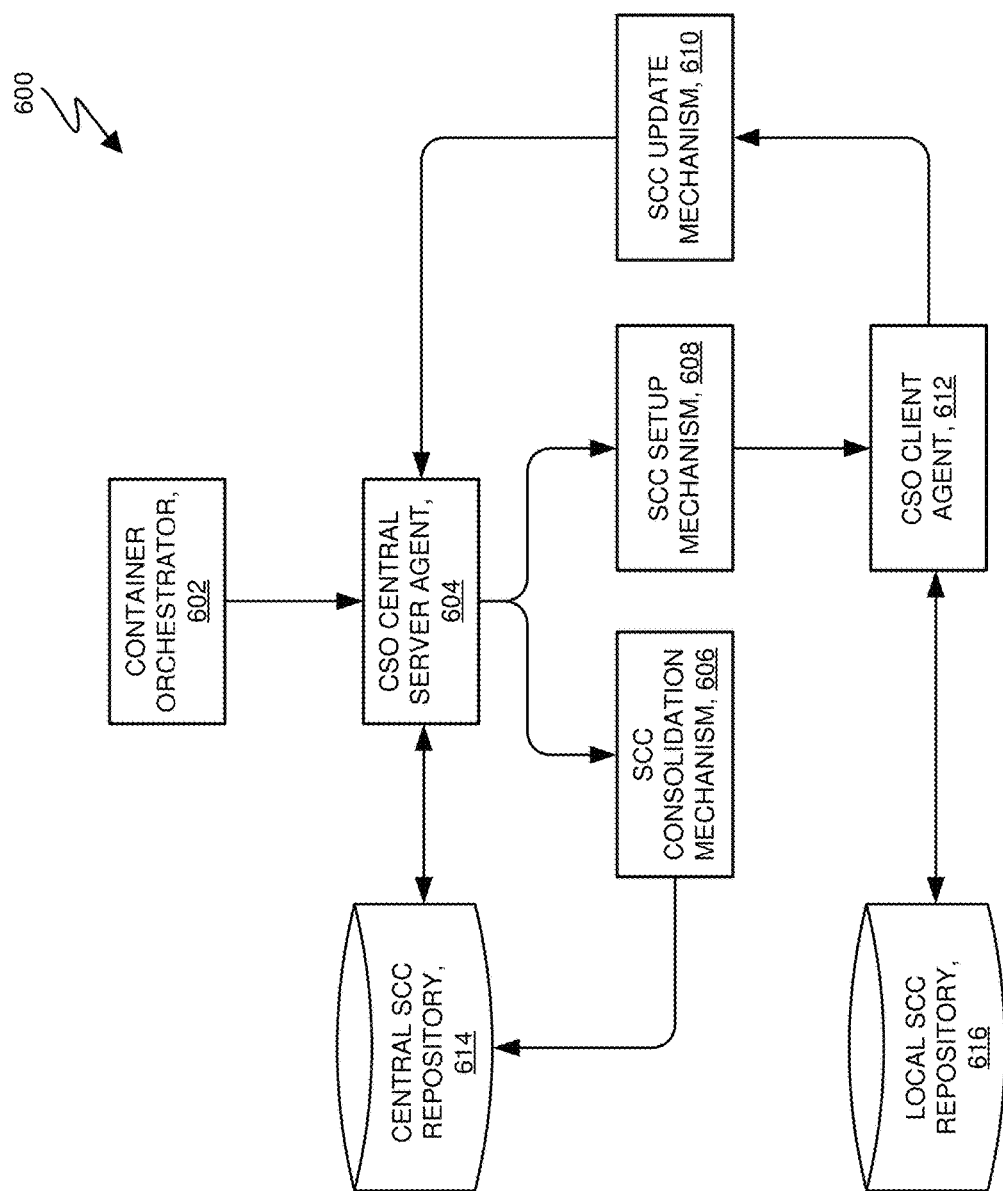
FIG. 6 is a block diagram showing some components of a system in accordance with at least one embodiment of the present invention.

Block diagram 600 of FIG. 6 shows an overview of components of a system in accordance with the present invention. The system includes: container orchestrator 602 (launches new Java applications); class sharing orchestrator (CSO) central server agent 604; SCC consolidation mechanism 606; SCC setup mechanism 608; SCC update mechanism 610; CSO client agent 612; central shared class cache (SCC) repository 614; and local SCC repository 616. Interactions and information flows, among and between the various system components, are shown by arrows and discussed in the following few paragraphs.

Some embodiments add the following software agents to the CSO: (i) CSO central server agent 604; and/or (ii) CSO client agent 612.

CSO Central Server Agent:

Some embodiments place CSO central server agent 604 on a dedicated node that is separate and distinct from any node that hosts a CSO client agent such as for example CSO client agent 612. CSO central server agent 604 performs the following functions: (i) provides freshly launched Java application containers with suitable SCCs at startup, where CSO central server agent 604 communicates with an existing container orchestration system to allow the CSO to have information about all the Java application images at play (within the scope of the CSO); (ii) manages central shared class cache (SCC) repository 614 used for persisting SCCs for each Java application image; (iii) associates a plurality of Java application containers with a respectively corresponding plurality of CSO client agent 612; and/or (iv) processes updates from CSO client agent 612, to generate higher quality SCCs for each Java application image.

CSO Client Agent:

CSO client agent 612 is a background process that runs on each worker node and serves applications running thereon. CSO client agent 612 functions include the following: (i) monitors states of the Java virtual machine (JVM), where the states include "active", "idle", or "exiting"; (ii) sends updates to CSO central server agent 604 when an application state is either "idle" or "exiting"; and/or (iii) manages local SCC repository 616 that persists shared class caches (SCCs) on worker nodes.

The central server orchestrator (CSO) has three mechanisms, implemented in conjunction with CSO central server agent 604 and CSO client agent 612 including the following mechanisms: (i) SCC setup mechanism 608; (ii) SCC update mechanism 610; and/or (iii) SCC consolidation mechanism 606.

SCC Setup Mechanism:

SCC setup mechanism 608, sets up a suitable base SCC, for a newly launched java application instance, by performing at least some of the following operations: (i) receiving information with respect to a new Java application instance; (ii) sending a base SCC to CSO client agent 612; and/or (iii) storing the base SCC in local SCC repository 616. These operations are further described in the following few paragraphs.

Receiving Information with Respect to a New Java Application Instance:

CSO central server agent 604 receives information, pertaining to the about-to-be-launched Java application instance, from an existing container orchestration system (container orchestrator 602), and attempts to find a suitable base SCC. Note, the associated container may already include an SCC supplied at image build time. Information received from container orchestrator 602 includes: (i) an image identifier (image ID), used for identifying a suitable base SCC; (ii) arguments passed to the Java application instance, used for identifying suitable base SCC; and/or (ii) a node on which to run the Java application instance, used for finding the associated CSO client agent 612. Every base SCC in central SCC repository 614 is keyed by the image ID and the arguments passed to the Java application instance. Consequently, multiple Java application instances having the same image ID, and the same arguments, share the same base SCC.

Sending Base SCC to CSO Client:

CSO central server agent 604 identifies a suitable base SCC based, at least in part, on the node information. CSO central server agent 604 sends the base SCC to the corresponding CSO client agent 612. CSO central server agent 604 sends the base SCC that the application needs via the associated CSO client agent 612. Each application is associated with a CSO client, because they are on the same node.

Storing the Base SCC Locally:

CSO client agent 612 stores the base SCC into local SCC repository 616, where the base SCC is made available for use by the new Java application instance.

SCC Update Mechanism:

SCC update mechanism 610 manages SCC updates by performing at least some of the following operations: (i) updates an original SCC; (ii) associates running applications with a CSO client (see CSO client agent 612); (iii) grows the SCC; and/or (iv) sends an SCC update request to CSO central server agent 604. CSO central server agent 604 may potentially reject the request for a number of reasons. The aforementioned operations, and reasons for potentially rejecting the request, and associated responses thereto, are described below in the following few paragraphs.

Update an Original SCC:

An update is essentially the difference (a diff) between the original (base) SCC, made available to the application's Java virtual machine (JVM) upon startup of the new Java application instance, and new SCC additions the JVM generates afterwards.

Associate Running Applications with a CSO Client:

Some embodiments associate every running application in the cloud with a CSO client (see CSO client agent 612). Consequently, there is one CSO client agent 612 for each worker node. CSO client agent 612 computes an update (a class cache) for each application and sends it to CSO central server agent 604 when the application is in an "idle" state or has finished executing (in an "exiting" state). By waiting for the application to enter either an "idle" or "exiting" state, CSO client agent 612 contributes to optimizing network traffic because the update doesn't compete with the application for network bandwidth. The timing of when the update takes place varies with the application, and/or the application workload. The CSO client makes use of a JVM idle-detection mechanism to schedule sending of an application's update to the CSO central server (see CSO central server agent 604).

Grow the SCC:

The shared class cache (SCC) grows from both ends towards the middle, where class data is added at one end of the SCC, and JIT data is added at the other end. With respect to the SCC, there are two "base pointers" for the original SCC, and two "current pointers" for the new additions made by the JVM. An SCC update comprises the content between the base pointers and the current pointers. CSO client agent 612 keeps track of the base pointers, and generates an SCC update for each Java application instance.

Send an SCC Update Request to the CSO Central Server:

Prior to sending an SCC update request, CSO client agent 612 (associated with a particular node) sends a request to CSO central server agent 604 to ensure that the SCC update will be accepted for further processing. If CSO central server agent 604 rejects the request, CSO central server agent 604 discards the request. Subsequently, the next instance of the application on the particular node uses a new SCC provided by CSO central server agent 604. The SCC update request comprises the following information: (i) an application image ID (for identifying the application type); (ii) arguments passed to the container (for identifying the application type); (iii) hardware information (for identifying the application type); (iv) node information (for identifying which CSO Client it is coming from); (v) SCC meta data (for example, base SCC version, size, etc.); and/or (vi) execution behavior data (for example, whether the application ended in the correct/expected/common way).

In some embodiments, the terms "application type", "managed runtime application type", and similar terms, refer to a Docker image identifier (application image ID). For example, consider a stock exchange web application. To get the web application up and running in the cloud, in some embodiments, the web application is packaged into a Docker image. The Docker image ID of the web application is the "application image ID". Mechanisms and/or features related to class data sharing, in embodiments of the present invention apply to applications of the same type. Instances of the same application can share data with each other. With respect to the Docker example above, the Docker image associated with the stock exchange web application can have many different instances (Docker containers) deployed on different machines in the cloud (they may serve the stock exchange service using a variety of physical machines, located at a variety of physical locations). All of the instances have the same Docker image ID and consequently are considered to be of the same type, and are able to share data among one other. Now consider a different application, for example, a video streaming web application. The video streaming web application and the stock exchange web application have different Docker image IDs, and consequently are not of the same type. Instances of the video streaming application have the same Docker image ID and consequently can share data among one another. However, instances of the video streaming application will not be able to share data with instances of the stock exchange application.

Note: the term "Docker" may be subject to trademark rights in various jurisdictions throughout the world and are used here only in reference to the products or services properly denominated by the marks to the extent that such trademark rights may exist.

Potential Reasons for Rejecting a Request, and Associated Responses:

CSO central server agent 604 may reject a request for at least one of the following reasons or factors: (i) an SCC for the application type on the CSO central server is full and no longer accepts new updates, in which case CSO client agent 612 stops computing and sending updates for the corresponding Java application instance; (ii) CSO central server agent 604 determines that the application did not behave normally (for example, the application returns an error code, an uncommon return code, and/or unexpected return code), and in response deems the update invalid; and/or (iii) CSO central server agent 604 deems the SCC update outdated, and consequently no longer accepts updates from such outdated versions. An SCC update is considered outdated if CSO central server agent 604 has a newer base SCC version compared to the base SCC version associated with the update, in which case, CSO client agent 612 stops computing and sending SCC updates for the corresponding Java application instance.

SCC Consolidation Mechanism:

SCC consolidation, in accordance with some embodiments of the present invention, generates higher quality SCCs, based at least in part on SCC updates provided by CSO client(s) (for example CSO client agent 612). CSO central server agent 604 analyzes (offline) a threshold number of most recently received SCC updates, to build a new base SCC that can be used by all subsequent Java application instances of the same type. Each SCC maps to an application type. Whereas instances of an application populate the cache, all instances of the application share the same SCC.

CSO central server agent 604 builds a new base SCC as follows:

Every time the CSO central server receives an update for a certain application type, it stores the update for later processing;

Once the CSO central server agent 604 receives a threshold number of updates, CSO central server agent 604 stops receiving new updates, and creates a new SCC based on the stored updates (the threshold number is heuristic-based—for example, in some embodiments, it is set to 80% of all application instances that are currently using the same base SCC from the CSO central server;

If there is a base SCC, associated with the application type, present on the CSO central server, then all of the base SCC content will be used in the new base SCC;

If there is new data that is common between more than one SCC update, then CSO central server agent 604 adds the new data to the new SCC (for example, if more than half of the updates indicate compilation of the same method, the CSO central server agent 604 deems the method to be "important" and includes the method in the new base SCC);

Once CSO central server agent 604 generates a new base SCC, CSO central server agent 604 rejects all update requests received from deployments launched using the old SCC, and thereafter accepts updates received only from deployments launched using the new base SCC.

Some embodiments of the present invention may include one, or more, of the following features, characteristics, and/or advantages: (i) a shared class cache (SCC) may be dynamic (read/write) rather than static (read only); (ii) profiling data, and other just-in-time (JIT) compiler hints may differ from run to run; (iii) profiling data can be accumulated over time to provide a better picture of the state of an application; and/or (iv) dynamic data in the SCC enables developers to perform offline analysis on the state of various applications, and dynamically modify SCCs to be optimized and more compact for each application.

Some embodiments of the present invention may recognize one, or more, of the following facts, potential problems, and/or potential areas for improvement with respect to the current state of the art: (i) the SCC is a memory mapped file; (ii) class data in an SCC comprises an immutable part of the classes; (iii) just-in-time (JIT) compiled data may include ahead of time (AOT) compiled code, and profiling data; (iv) may need a "warm-up run" to populate the shared class cache; (v) subsequent runs may have improved startup time and footprint; and/or (vi) may need to be on the same node.

Figure 7:
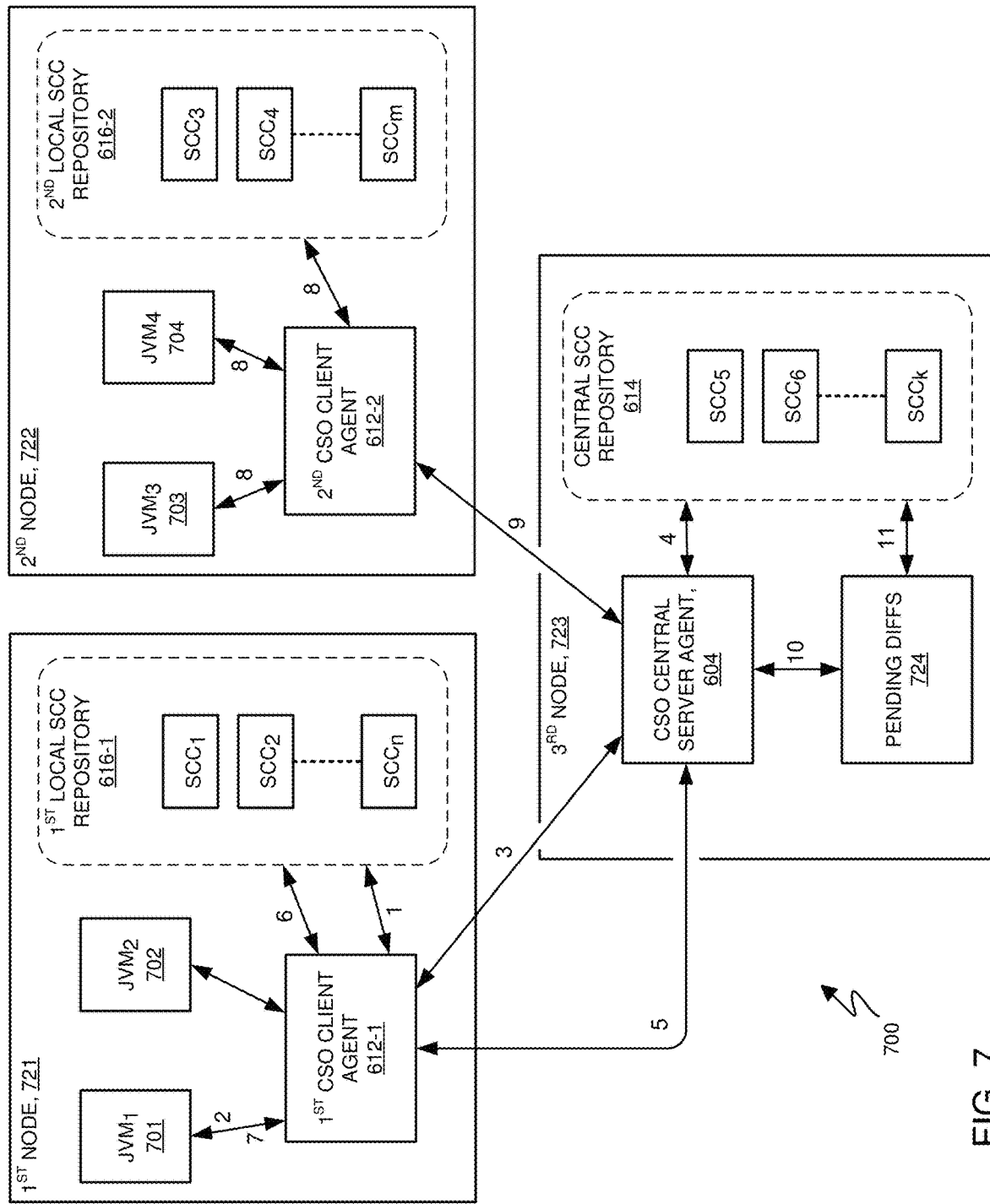
FIG. 7 is a block diagram showing information flow among various system components in accordance with at least one embodiment of the present invention.

Block diagram 700 of FIG. 7 shows a process for setting up, updating, and consolidating shared class caches, in accordance with some embodiments of the present invention, including: CSO central server agent 604; $1^{ST}$ CSO client agent 612-1; $2^{ND}$ CSO client agent 612-2; Central SCC repository 614, comprising $SCC_5$, $SCC_6$ ... $SCC_k$; $1^{ST}$ local SCC repository 616-1, comprising $SCC_1$, $SCC_2$ ... $SCC_n$, $2^{ND}$ local SCC repository 616-2, comprising $SCC_3$, $SCC_4$ ... $SCC_m$; $JVM_1$ 701; $JVM_2$ 702; $JVM_3$ 703; $JVM_4$ 704; $1^{ST}$ node 721; $2^{ND}$ node 722; 3 node 723; and/or pending diffs 724.

Operation numbers 1 through 11 below respectively correspond to like numbered arrows of FIG. 7. Three processes in accordance with some embodiments of the present invention (and discussed above with respect to FIG. 6) comprise: SCC setup (operations 1 through 7); SCC update (operations 8 through 10); and SCC consolidation (operation 11).

SCC Setup

1. Cache sharing orchestrator ($1^{ST}$ CSO client agent 612-1) receives information, from $1^{ST}$ local shared class cache repository ($1^{ST}$ local SCC repository 616-1), with respect to a container image to be launched, and associated parameters. $1^{ST}$ CSO client agent 612-1 searches local repository 616-1 for a suitable SCC.

2. If $1^{ST}$ CSO client agent 612-1 finds a suitable SCC, $1^{ST}$ CSO client agent 612-1 mounts the SCC in a Java Virtual Machine container (for example, $JVM_1$ 701).

3. If $1^{ST}$ CSO client agent 612-1 does not find a suitable SCC in local $1^{ST}$ local SCC repository 616-1, $1^{ST}$ CSO client agent 612-1 sends a request to CSO central server agent 604 to locate a suitable SCC.

4. CSO central server agent 604 searches central SCC repository 614 (a global SCC repository), finds and retrieves a suitable SCC.

5. CSO central server agent 604 returns the suitable SCC to $1^{ST}$ CSO client agent 612-1.

6. $1^{ST}$ CSO client agent 612-1 installs the suitable SCC in the local repository.

7. $1^{ST}$ CSO client agent 612-1 also mounts the suitable SCC in the $JVM_1$ 701.

SCC Update

8. $2^{ND}$ CSO client agent 612-2 queries the status of associated JVMs ($JVM_3$ 703, and $JVM_4$ 704). $2^{ND}$ CSO client agent 612-2 further queries SCC status, held in $2^{ND}$ local SCC repository 616-2, to determine if $JVM_3$ 703 and/or $JVM_4$ 704 have new content not present in a corresponding SCC of $2^{ND}$ local SCC repository 616-2. If a threshold amount of new content is present in $JVM_3$ 703 and/or $JVM_4$ 704, $2^{ND}$ CSO client agent 612-2 computes a difference (a "diff") based on new content associated with $JVM_3$ 703 and/or $JVM_4$ 704 in view of content cached in $2^{ND}$ local SCC repository 616-2.

9. $2^{ND}$ CSO client agent 612-2 sends an update request, including the diff to CSO central server agent 604. In some embodiments, $2^{ND}$ CSO client agent 612-2 first sends a "probe message" to determine if CSO central server agent 604 will accept the update request.

10. In response to accepting the update request, CSO central server agent 604 stores the diff in pending diffs 724.

SCC Consolidation

11. In response to accumulating a threshold number of new update requests in pending diffs 724, CSO server analyses the update requests (including respectively corresponding pending diffs) and selects information for propagation to central SCC repository 614 (a global repository). Central SCC repository 614 increments the base version of any shared class cache ($SCC_5$, $SCC_6$, ... $SCC_k$) that is updated. CSO central server agent 604 rejects updates directed lower versions.

Some embodiments of the present invention may include one, or more, of the following features, characteristics, and/or advantages: (i) shares dynamic class data; (ii) continuously improves the quality of class data in a cloud environment; (iii) a cache update system efficiently produces shared class cache updates by deploying software agents on every node and by keeping track of shared class cache base snapshots for each application running in a cloud environment; (iv) a cache consolidation system continuously improves the quality of the cache by efficiently collecting class cache updates from software agents and by effectively consolidating the updates using a set of rules that guarantees improvements over conventional solutions; (v) a cache orchestration system manages caching data from all running applications in a cloud environment; (vi) a cache update and consolidation system continuously improves the cached results over time; (vii) improves the applicability of dynamic shared class data in a cloud environment; (viii) provides a class sharing orchestrator; (ix) shares cloud-wide and/or cluster-wide class data; and/or (x) initiates launch of a managed runtime application by a class sharing orchestrator in a containerized environment.

Some embodiments of the present invention comprise a computer-implemented method, a computer program product for performing the method, and/or a computer system for performing the method, for sharing cached class data, the method comprising: (i) in response to initiating a launch of a managed runtime application by a container orchestrator in a containerized environment, receiving, by a class sharing orchestrator central server, information including, an image ID, arguments passed to an instance of the managed runtime application and an identifier of a worker node to run the instance, from the container orchestrator; (ii) in response to locating, by the class sharing orchestrator central server, a suitable base shared class cache in the central shared class cache repository, based on search criteria comprising the image ID and the list of arguments passed to the managed runtime application instance, sending the suitable base shared class cache by the class sharing orchestrator central server to a corresponding class sharing orchestrator client identified using the information for the worker node; (iii) in response to receiving the suitable base shared class cache from the class sharing orchestrator central server, storing the suitable base shared class cache by the corresponding class sharing orchestrator client into a local shared class cache repository for use by the instance of the managed runtime application; (iv) in response to the class sharing orchestrator central server receiving from the corresponding class sharing orchestrator client a request to process an update, including the image ID, the arguments passed, hardware information, node information, additional shared class data with respect to the base SCC received by the class sharing orchestrator client, determining by the class sharing orchestrator central server whether to accept the update; (v) in response to rejecting the request to process the update by the class sharing orchestrator central server, discarding the update by the class sharing orchestrator central server; (vi) sending a new shared class cache by the class sharing orchestrator central server to the corresponding class sharing orchestrator client; (vii) in response to accepting the request to process the update by the class sharing orchestrator central server, for a particular type of the managed runtime application, storing the update for later offline processing by the class sharing orchestrator central server; (viii) analyzing a configurable number of recent updates received by the class sharing orchestrator central server to create analyzed data; (ix) in response to a determination by the class sharing orchestrator central server using the analyzed data there is an old base shared class cache present on the class sharing orchestrator central server for the particular type, generating a new base shared class cache using all content of the old base shared class cache; (x) in response to a determination by the class sharing orchestrator central server there is new data common between more than one update, adding the new data to the new base shared class cache by the class sharing orchestrator central server; and (xi) in response to generating the new base shared class cache, rejecting by the class sharing orchestrator central server update requests from deployments launched using the old shared class cache.

In an example embodiment, consider the following scenario where three nodes (node-1, node-2, and node-3) respectively host the following: three instances of an application (app-1, app-2, and app-3, all of a given application type); three local cache sharing orchestrator (CSO) clients (CSO-1, CSO-2, and CSO-3); and three local cache repositories (cache-1, cache-2, and cache-3). A fourth node (node-4) hosts a CSO central server and a central cache repository which has a base shared class cache (SCC) specific to applications of the given application type.

CSO central server communicates with CSO-1, CSO-2, and CSO-3 to receive any local cache updates that app-1, app-2, and app-3 generate during execution. Based on the local cache updates received, the CSO central server updates the base SCC, corresponding to the given application type, in the central cache repository.

While app-1 runs, CSO-1 collects and stores associated cache data in the local cache repository, cache-1. Consider now that CSO-1 eventually generates an update request, and sends the request to the CSO central server. The CSO central server searches the central cache repository for a suitable base SCC. Once the CSO central server identifies the base SCC, it determines that cache-1 (local to app-1) is outdated. In response, the CSO central server rejects the update request from CSO-1, and sends the base SCC, from the central cache repository, to CSO-1 on node-1. The same process occurs with app-2 and app-3, where CSO-2 and CSO-3 respectively collect and store associated cache data in respective local caches, send update requests to the CSO central server, and receive updated base SCCs to update their local caches if/when respective local caches have been determined, by the CSO central server, to be outdated.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Electrically Connected: means either directly electrically connected, or indirectly electrically connected, such that intervening elements are present; an electrical connection may include, but need not be limited to, elements such as capacitors, inductors, transformers, vacuum tubes, and the like.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard as to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and/or application-specific integrated circuit (ASIC) based devices.

What is claimed is:

1. A computer-implemented method for sharing cached class data, the method comprising:
    initiating launch of a managed runtime application in a container of a containerized environment;
    receiving information with respect to the managed runtime application including an application image identifier, an argument associated with the managed runtime application, and a worker node identifier corresponding to a worker node associated with the managed runtime application;
    locating a first shared class cache (SCC), keyed by a combination of the application image identifier and the argument, in a central SCC repository managed by a server; and
    in response to locating the first SCC:
        sending the first SCC to a client associated with the worker node, and
        storing the first SCC in a local SCC repository.

2. The method of claim 1, further comprising:
    receiving, from the client, a first update request associated with a type of the managed runtime application, including the application image identifier, the argument, information with respect to the worker node, additional class data, ahead-of-time compiled data, and execution data generated and accumulated over time with respect to the first SCC;
    determining to accept the first update request; and
    in response to accepting the first update request:
        analyzing a plurality of update requests, including the first update request, to create analyzed update request data,
        determining, based on the analyzed update request data, the analyzed update request data includes new data that is common to more than one update request of the plurality of update requests, and
        modifying the first SCC, based on the new data, to generate a second SCC.

3. The method of claim 2, wherein the type of the managed runtime application is based on the application image identifier, wherein a plurality of managed runtime applications having a common application image identifier are of a same type.

4. The method of claim 1, further comprising:
    receiving, from the client, a first update request originated by the managed runtime application and associated with the first SCC, wherein the first update request is associated with a type of the managed runtime application, including the application image identifier, the argument, information with respect to the worker node, additional class data, ahead-of-time compiled data, and execution data generated and accumulated over time with respect to the first SCC;
    determining to reject the first update request; and
    in response to rejecting the first update request, sending, to the client, a second SCC.

5. The method of claim 4, wherein determining to reject the first update request is based on a factor selected from the group consisting of: (i) the first SCC is full; (ii) the managed runtime application returns an error code; (iii) the managed runtime application returns an unexpected return code; and (iv) the second SCC is newer than the first SCC.

6. The method of claim 1, wherein the server is placed on a dedicated node separate and distinct from the worker node.

7. The method of claim 1, wherein the server performs a task selected from the group consisting of:
providing the container with the first SCC in conjunction with the launch of the managed runtime application;
communicating with a container orchestration system to obtain information with respect to managed runtime application images within a scope of the server;
managing the central SCC repository;
associating the container with a corresponding client; and
updating the first SCC in accordance with an update request received from the client.

8. A computer program product for sharing cached class data comprising:
one or more computer readable storage media, and program instructions collectively stored on the one or more computer readable storage media, the program instructions comprising instructions programmed to perform:
initiating launch of a managed runtime application in a container of a containerized environment;
receiving information with respect to the managed runtime application including an application image identifier, an argument associated with the managed runtime application, and a worker node identifier corresponding to a worker node associated with the managed runtime application;
locating a first shared class cache (a first SCC), keyed by a combination of the application image identifier and the argument, in a central SCC repository managed by a server; and
in response to locating the first SCC:
sending the first SCC to a client associated with the worker node; and
storing the first SCC in a local SCC repository.

9. The computer program product of claim 8, further comprising instructions programmed to perform:
receiving, from the client, a first update request associated with a type of the managed runtime application, including the application image identifier, the argument, information with respect to the worker node, additional class data, ahead-of-time compiled data, and execution data generated and accumulated over time with respect to the first SCC;
determining to accept the first update request; and
in response to accepting the first update request:
analyzing a plurality of update requests, including the first update request, to create analyzed update request data,
determining, based on the analyzed update request data, the analyzed update request data includes new data that is common to more than one update request of the plurality of update requests, and
modifying the first SCC, based on the new data, to generate a second SCC.

10. The computer program product of claim 9, wherein the type of the managed runtime application is based on the application image identifier, wherein a plurality of managed runtime applications having a common application image identifier are of a same type.

11. The computer program product of claim 8, further comprising instructions programmed to perform:
receiving, from the client, a first update request originated by the managed runtime application and associated with the first SCC, wherein the first update request is associated with a type of the managed runtime application, including the application image identifier, the argument, information with respect to the worker node, additional class data, ahead-of-time compiled data, and execution data generated and accumulated over time with respect to the first SCC;
determining to reject the first update request; and
in response to rejecting the first update request, sending, to the client, a second SCC.

12. The computer program product of claim 11, wherein determining to reject the first update request is based on a factor selected from the group consisting of: (i) the first SCC is full; (ii) the managed runtime application returns an error code; (iii) the managed runtime application returns an unexpected return code; and (iv) the second SCC is newer than the first SCC.

13. The computer program product of claim 8, wherein the server is placed on a dedicated node separate and distinct from the worker node.

14. The computer program product of claim 8, wherein the server performs a task selected from the group consisting of:
providing the container with the first SCC in conjunction with the launch of the managed runtime application;
communicating with a container orchestration system to obtain information with respect to managed runtime application images within a scope of the server;
managing the central SCC repository;
associating the container with a corresponding client; and
updating the first SCC in accordance with an update request received from the client.

15. A computer system for sharing cached class data comprising:
a processor set; and
one or more computer readable storage media;
wherein:
the processor set is structured, located, connected and/or programmed to run program instructions stored on the one or more computer readable storage media; and
the program instructions include instructions programmed to perform:
initiating launch of a managed runtime application in a container of a containerized environment;
receiving, by a class sharing orchestrator (CSO) central server, information with respect to the managed runtime application including an application image identifier, an argument associated with the managed runtime application, and a worker node identifier corresponding to a worker node associated with the managed runtime application;
locating a first shared class cache (a first SCC), keyed by a combination of the application image identifier and the argument, in a central SCC repository managed by the CSO central server; and
in response to locating the first SCC:
sending the first SCC to a CSO client associated with the worker node; and
storing the first SCC, in a local SCC repository.

16. The computer system of claim 15, further comprising instructions programmed to perform:
    receiving, from the client, a first update request associated with a type of the managed runtime application, including the application image identifier, the argument, information with respect to the worker node, additional class data, ahead-of-time compiled data, and execution data generated and accumulated over time with respect to the first SCC;
    determining to accept the first update request; and
    in response to accepting the first update request:
        analyzing a plurality of update requests, including the first update request, to create analyzed update request data,
        determining, based on the analyzed update request data, the analyzed update request data includes new data that is common to more than one update request of the plurality of update requests, and
        modifying the first SCC, based on the new data, to generate a second SCC.

17. The computer system of claim 16, wherein the type of the managed runtime application is based on the application image identifier, wherein a plurality of managed runtime applications having a common application image identifier are of a same type.

18. The computer system of claim 15, further comprising instructions programmed to perform:
    receiving, from the client, a first update request originated by the managed runtime application and associated with the first SCC, wherein the first update request is associated with a type of the managed runtime application, including the application image identifier, the argument, information with respect to the worker node, additional class data, ahead-of-time compiled data, and execution data generated and accumulated over time with respect to the first SCC;
    determining to reject the first update request; and
    in response to rejecting the first update request, sending, to the client, a second SCC.

19. The computer system of claim 18, wherein determining to reject the first update request is based on a factor selected from the group consisting of: (i) the first SCC is full; (ii) the managed runtime application returns an error code; (iii) the managed runtime application returns an unexpected return code; and (iv) the second SCC is newer than the first SCC.

20. The computer system of claim 15, wherein the server performs a task selected from the group consisting of:
    providing the container with the first SCC in conjunction with the launch of the managed runtime application;
    communicating with a container orchestration system to obtain information with respect to managed runtime application images within a scope of the server;
    managing the central SCC repository;
    associating the container with a corresponding client; and
    updating the first SCC in accordance with an update request received from the client.

\* \* \* \* \*